W. I. CLARK.
BRAKE LOCKING ATTACHMENT FOR FORD AUTOMOBILES.
APPLICATION FILED MAR. 12, 1917.
1,252,238. Patented Jan. 1, 1918.
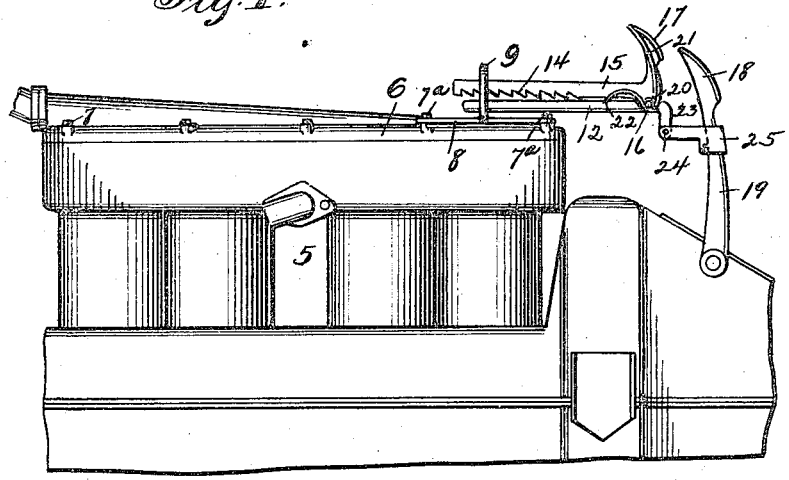
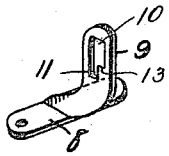
Inventor
Walter I. Clark,
By Samuel Herrick,
Attorney
Witness
F. G. Campbell
R. D. Broadbent.

UNITED STATES PATENT OFFICE.

WALTER I. CLARK, OF BRIDGEPORT, NEBRASKA.

BRAKE-LOCKING ATTACHMENT FOR FORD AUTOMOBILES.

1,252,238.  Specification of Letters Patent.  Patented Jan. 1, 1918.

Application filed March 12, 1917. Serial No. 154,325.

*To all whom it may concern:*

Be it known that I, WALTER I. CLARK, a citizen of the United States of America, residing at Bridgeport, in the county of Morrill and State of Nebraska, have invented certain new and useful Improvements in Brake-Locking Attachments for Ford Automobiles, of which the following is a specification.

This invention relates to a brake locking attachment for Ford automobiles. The Ford automobile is provided with two brakes, namely, a hand operated emergency brake that is provided with a ratchet to hold it in set position and a foot brake which is not provided with any holding means.

It is, therefore, the primary object of the present invention to provide an attachment which may be very readily and quickly applied to the standard Ford engine and which, when in position, will provide efficient means for holding the foot brake in set position.

A device of the above nature is desirable because the hand operated emergency brakes of Ford automobiles are sometimes ineffective to hold the machine against creeping when the engine is cranked. This is particularly true in cold weather when the oil on the clutch is thick and viscous. Furthermore, the attachment herein shown and described provides an additional element of safety when the car is left standing upon heavy grades.

Further objects and advantages of the invention will be set forth in the detailed description which now follows:

In the accompanying drawing

Figure 1 is a fragmentary, side view of a Ford engine having the attachment applied thereto, and Fig. 2 is a perspective view of a detent plate hereinafter described.

Like numerals designate corresponding parts in both of the figures of the drawing.

Referring to the drawing 5 designates a Ford engine of the usual and well-known type and 6 the cylinder head thereof. These cylinder heads are usually held in place by cap screws or bolts 7.

In carrying out the invention I provide a plate 8 adapted to lie horizontally upon the cylinder head and to be secured in position by the two rear cylinder head bolts 7ª. The plate 8 carries an upstanding web 9 having an opening 10 formed therethrough. At its lower portion this opening is of two different depths. That is, it has a portion 11 that receives a guide rod 12, said guide rod being slidable through the portion 11. At the right of the portion 11 (see Fig. 2) there is a shoulder or lip 13 which acts as a detent for ratchet teeth 14 formed upon a ratchet bar 15. The ratchet bar is pivoted at 16 to the guide rod 12 and it carries a pedal 17 disposed in such proximity to the pedal 18 of the foot brake lever 19 that the two pedals may be engaged by the foot simultaneously or the pedal 18 may be engaged independently of the pedal 17. A spring 20 surrounds the pivot 16 and one end 21 of this spring engages the foot plate of the pedal 17 and the other end engages in a notch 22 formed in the guide rod 12. The downturned extension 23 of the guide rod is pivoted at 24 to a clamp 25 that is engaged with a foot brake lever 19.

By pressing upon the pedals 17 and 18 simultaneously, or in other words, by pressing upon the foot brake and by rocking the toe over to apply pressure upon the pedal 17, the ratchet teeth 14 will be forced into engagement with the lip 13 and when the foot is removed from the pedal the frictional engagement of the ratchet teeth with the lip 13 will be sufficient to hold the parts in locked position; that is, to hold the foot brake lever 19 in its forward position at which time the brake is set.

When it is desired to release the brake it is only necessary to press forward upon the pedal 18 without pressing the pedal 17 and as soon as the engaged ratchet tooth is released from the lip 13 the spring 20 acts to throw the ratchet bar 15 upwardly and to move the ratchet teeth out of engagement with the lip 13 whereupon the foot brake lever 19 may move rearwardly in the usual manner without interference by the attachment. In the aforesaid operation the guide bar 12 moves in the portion 11 of the opening 10 and holds the several parts in proper alinement.

From the foregoing description it will be seen that there is herein provided a very simple and inexpensive attachment adapted to be readily and quickly placed in position by the mere removal and replacement of the cap screws 7ª and by the attachment of the clamps 25 to the foot brake lever 19. It is to be understood, however, that the invention is not limited to the precise construction set forth but that it includes within its purview such changes as fairly come within the spirit of the appended claims.

Having described my invention what I claim is:—

1. The combination of a foot brake lever, of a detent plate, a ratchet bar carrying a pedal coacting with said detent plate and a guide bar slidable through said detent plate to which said ratchet bar is pivoted.

2. The combination of a foot brake lever, of a detent plate, a ratchet bar carrying a pedal coacting with said detent plate and a guide bar slidable through said detent plate to which said ratchet bar is pivoted and spring means normally tending to move said ratchet bar out of alinement with the coacting part of the detent plate.

3. The combination with an engine and associated foot brake lever, of a detent plate secured in position upon the top of the engine, a rack bar slidable therethrough, a guide bar slidable through the detent plate to which said rack bar is pivoted, a pedal carried by said rack bar and arranged in juxtaposition to the pedal of the foot brake and means for connecting said guide bar to said foot brake lever.

4. A device of the character described comprising a detent plate having an opening therethrough and having a lip formed at one side of said opening, a guide bar slidable through the detent plate at one side of said lip, a rack bar slidable through said detent plate and having teeth adapted to engage said lip, said rack bar being pivoted at its rear end to the guide bar, a pedal carried by the rack bar, spring means between the pedal and the guide bar, said spring means normally tending to move the teeth of the rack bar out of engagement with said lip, a foot brake lever, a clamp secured to said foot brake lever and a connection between said clamp and the guide bar.

In testimony whereof I affix my signature in the presence of two witnesses.

WALTER I. CLARK.

Witnesses:
C. G. PERRY,
MARY E. HASTIE.

Copies of this patent may be obtained for five cents each, by addressing the "Commissioner of Patents, Washington, D. C."